(12) United States Patent
Kepes et al.

(10) Patent No.: US 6,560,954 B2
(45) Date of Patent: May 13, 2003

(54) HIGH SPEED BINDER APPLICATION DEVICE

(75) Inventors: George B. Kepes, Cote St. Luc (CA); John T. Marcelissen, Beaconsfield (CA)

(73) Assignee: Tensor Machinery Ltd., Lachine (CA)

(*) Notice: Subject to any disclaimer, the term of this patent is extended or adjusted under 35 U.S.C. 154(b) by 37 days.

(21) Appl. No.: 09/844,775

(22) Filed: Apr. 27, 2001

(65) Prior Publication Data

US 2002/0157373 A1 Oct. 31, 2002

(51) Int. Cl.[7] .................................................. D01H 1/00
(52) U.S. Cl. ................................................. 57/10; 57/66
(58) Field of Search ............................. 57/3, 6, 7, 9–18, 57/66, 76, 312; 428/34.5, 35.7

(56) References Cited

U.S. PATENT DOCUMENTS

| 4,154,049 A | 5/1979 | King et al. |
| 4,205,899 A | 6/1980 | King et al. |
| 4,388,799 A | 6/1983 | Vives |
| 4,663,928 A | 5/1987 | Delobel et al. |
| 4,689,942 A | 9/1987 | Chateau |
| 4,757,675 A | 7/1988 | Oglesby et al. |
| 4,974,408 A | 12/1990 | Karhu |
| 5,385,007 A | 1/1995 | Hartel et al. |
| 5,405,668 A | * 4/1995 | Sandt .......................... 267/166 |
| 5,588,290 A | 12/1996 | Cobb |
| 5,644,905 A | 7/1997 | Luthardt et al. |
| 5,791,134 A | * 8/1998 | Schneider et al. .............. 57/11 |
| 5,826,419 A | * 10/1998 | Shelander et al. .............. 57/11 |
| 5,896,735 A | 4/1999 | Wirtz |
| 6,051,313 A | * 4/2000 | Olry et al. ................... 156/148 |

* cited by examiner

Primary Examiner—John J. Calvert
Assistant Examiner—Shaun R Hurley
(74) Attorney, Agent, or Firm—Alston & Bird LLP

(57) ABSTRACT

A high-speed binder application device for wrapping binder material about a bundle of buffer tubes that contain optical fibers includes a pair of opposite facing binder heads mounted on a pair of hollow shafts, each shaft being driven in rotation by a concentric drive. Each binder head includes a light-weight synthetic guide drum that dispenses binder material from a reel and onto the bundle of buffer tubes as it is advanced through the hollow shafts. The lightweight and high strength of the synthetic guide drums allows the drums to be rotated at speeds in excess of 4000 RPM. Each drive is concentrically mounted on its respective shaft which reduces or eliminates the shaft bending loads associated with prior belt-driven binder devices, and thus reduces vibrations at higher rotational speeds.

29 Claims, 3 Drawing Sheets

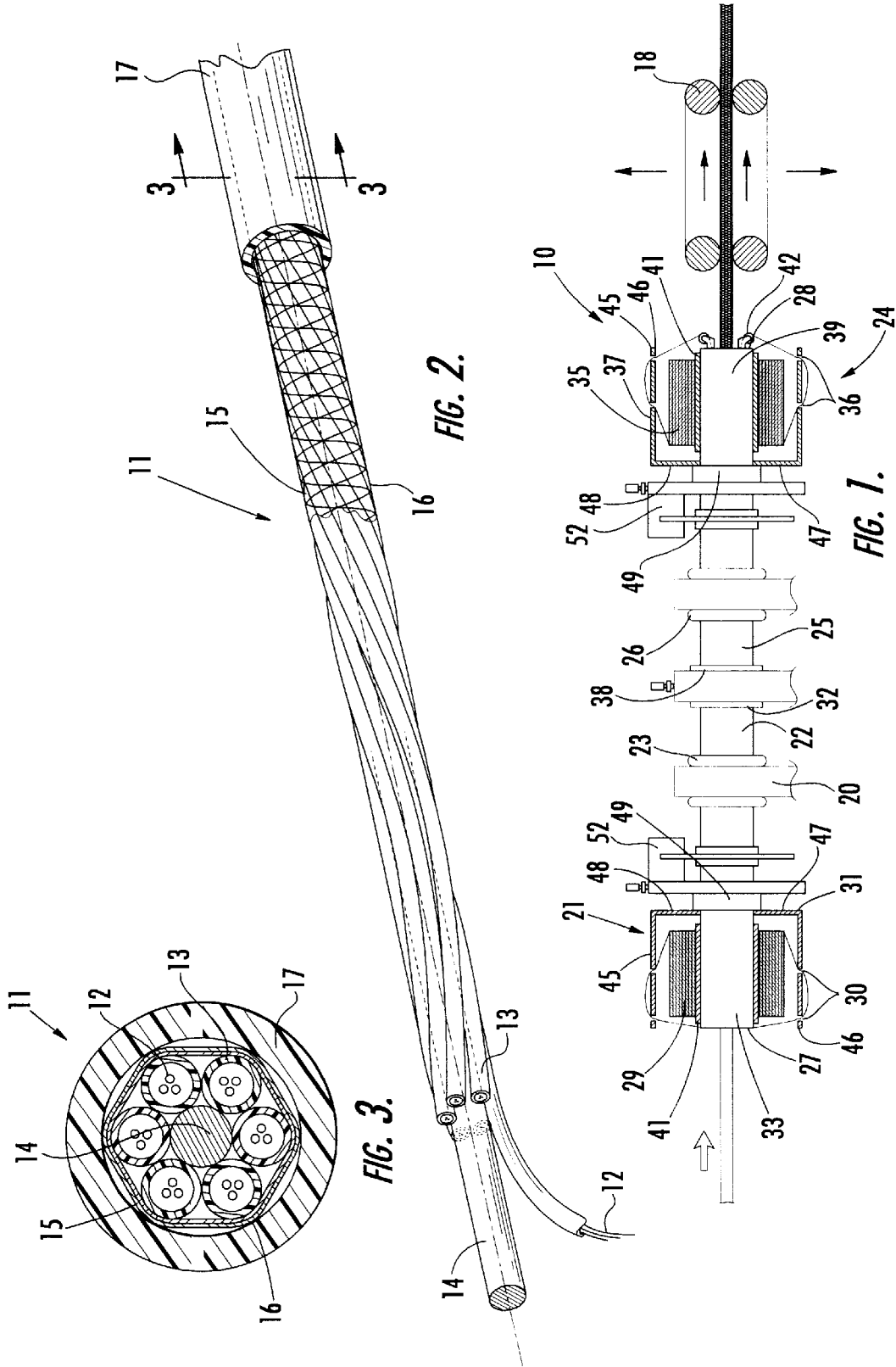

HIGH SPEED BINDER APPLICATION DEVICE

FIELD OF THE INVENTION

The present invention relates to manufacturing fiber optic cable, and more particularly relates to an apparatus for the application of a binder about a bundle of optical fibers.

BACKGROUND OF THE INVENTION

An increased volume of Internet use and the desire to send and receive data-intensive multimedia applications have greatly increased the demands put on the existing communications infrastructure. This has led to a push for greater bandwidth capabilities through the use of fiber optic cables in lieu of traditional copper cables. Increased demand for fiber optic cable has resulted in a need for ever-increasing production rates for cable winding machines.

Fiber optic cable of various configurations are in use for communications. In many commonly used types of cables, the optical fibers are encased in protective buffer tubes which are formed of a flexible plastic material. Such fiber optic cables also often include a central reinforcing member about which the buffer tubes are arranged to provide strength to the cable. After the buffer tubes have been positioned around the central reinforcing member, yarn-like binders are wound around the buffer tubes to retain the buffer tubes in position against one another and the central reinforcing member. A plastic sheath or jacket is then provided over the binder and buffer tubes for added protection.

Various winding techniques for helically winding buffer tubes around the central reinforcing member have been employed. One advantageous method is to arrange the buffer tubes around the central reinforcing member using a reverse oscillating lay technique. The buffer tubes are provided from non-orbiting supply sources and advanced in a direction generally parallel to the central reinforcing member. One or more lay plates are provided having a central opening for the central reinforcing member and a plurality of radially spaced openings about the central reinforcing member. From the most downstream lay plate, the buffer tubes converge towards the central reinforcing member at a closing point and are laid against the central reinforcing member in an oscillating lay. Typically, eight turns are applied in one direction before reversing to the opposite direction. This technique is also known as "S-Z" stranding in reference to the appearance of the oscillated buffer tubes once engaged against the central reinforcing member.

The buffer tubes and central reinforcing member are then advanced through an aluminum or steel binder head of a binder device where the binder is wound around the buffer tubes. The binder device may also include a second binder head positioned downstream of the first binder head for winding a second binder around the buffer tubes in an opposite direction. A binder head of this type is illustrated in U.S. Pat. No. 4,325,212 to Hope nee Swiecicki. As illustrated in FIG. 2, the binder head includes a binder reel rotatably supported on a hollow shaft which surrounds the fiber optic cable. The shaft is supported at its downstream end on bearings and has an upstream free end. The shaft and the binder reel are rotated by a conventional belt-and-pulley drive. As the reel is rotated, one or more binder guides pay out the binder over the free end of the shaft so that it can be wound around the buffer tubes. A capstan is typically provided downstream of the binder heads for pulling the fiber optic cable through the apparatus.

Current cable winding machines are limited in their production rates because the binder has to run at high speeds to get a meaningful cable production rate. In addition, the tension in the binder as it is applied must fall within stringent tolerances on the order of ±10%. Typically, binders are applied on the cable at a pitch, or lay length, of between 15 mm and mm, most commonly 20 mm. Actual running speeds of binder application machines is currently limited to 3600 to 3800 RPM, which translates into a cable line production speed of about 76 meters per minute at a 20 mm pitch. An increase of the rotational speed of the binder applicator to even 5000 RPM would result in a 32% cable line production speed increase at the same 20 mm lay length.

It is generally difficult to achieve rotational speeds that exceed 4000 RPM with many existing binder devices because of a concomitant increase in centrifugal forces and vibration loads on the binder device. Such high centrifugal forces may break or damage the binder device. Aluminum binder heads typically weigh over 8 kg each and may structurally fail due to centrifugal forces at a rotational speed of 4000 RPM which results in a loss in cable production time.

Beyond binder head failure, the useful life of the binder device can be reduced by the existence of centrifugal forces, vibrations and other loads. Vibration can result from various sources including unbalance of one or more of the drive components for the binder head, or of the binder head itself. For instance, an unbalance of one gram located at a 100 mm radius and rotating at 5000 RPM results in a centrifugal force of 6.24 lbs. In some existing binder devices, the vibrations of the drive components have harmonics at around 3200 to 3400 RPM that coincide with the harmonics of the tubular shaft, which can cause a forced resonance of the shaft that may lead to failure of the shaft. In addition, the vibration loads and the weight of the binder head cantilevered from the end of the shaft degrade the bearings supporting the shaft. Tension in the pulley of the belt-and pulley drive system adds to the detrimental loads on the shaft and bearings.

Therefore, it would be desirable to increase fiber optic cable production speeds by increasing the speed of binder application without decreasing the useful life of the binder applicator or the creation of a situation where there is a structural failure of the binder head.

SUMMARY OF THE INVENTION

The present invention addresses the above needs and achieves other advantages by providing a high-speed binder device for binding together various components of a cable, especially a fiber optic cable, in which a binder head or a guide drum for guiding a binder is formed of a lightweight synthetic material, such as a carbon fiber composite material, that reduces the occurrence of increased loads and vibrations at speeds above 4000 RPM. The lightweight material preferably has a substantially higher strength-to-weight ratio than more conventional materials, such as aluminum or steel. The increased rotational speeds allowed by the present invention can result in a double-digit percentage increase in cable line production speeds. Increased production speeds are desirable considering the increasing demand for fiber optic cable.

The high-speed binder device comprises a frame supporting a binder reel. A supply of binder is wound on the binder reel and the binder reel rotates on the frame. The binder reel defines a central opening through which the cable to be bound is advanced. A guide drum is also rotatably supported on the frame and is operatively connected to the drive motor for paying out binder from the binder reel and wrapping the binder around the cable. Constructing the guide drum of a lightweight synthetic material allows the guide drum to be rotated at a high rate of speed without failing or excess loading of the binder device and its bearings.

Preferably, the guide drum is comprised of a composite material, such as a carbon fiber material, although other lightweight synthetic materials such as high-strength plastics could be used. The guide drum defines a tubular shape that has a substantially cylindrical wall with a radial thickness of approximately 1/8 of an inch. The tubular shape has an open end and a closed end. The closed end comprises an aluminum hub to which the fiber composite wall is adhered with an epoxy material. In this configuration, the guide drum comprised of carbon fiber weighs less than 4 lbs., and more preferably weighs approximately 3.6 lbs., as compared with about 18 lbs. for a conventional aluminum drum.

The low weight and high strength of the carbon fiber material allows the guide drum to withstand higher rotational speeds in excess of 4000 RPM. The decreased weight of the cantilevered guide drum decreases the loads exerted on the shaft, bearings and other components of the binder device. The decreased weight of the guide drum also reduces unbalanced loads and allows for operation with relatively low vibrations at higher rotational speeds.

BRIEF DESCRIPTION OF THE DRAWINGS

Figure 4A:
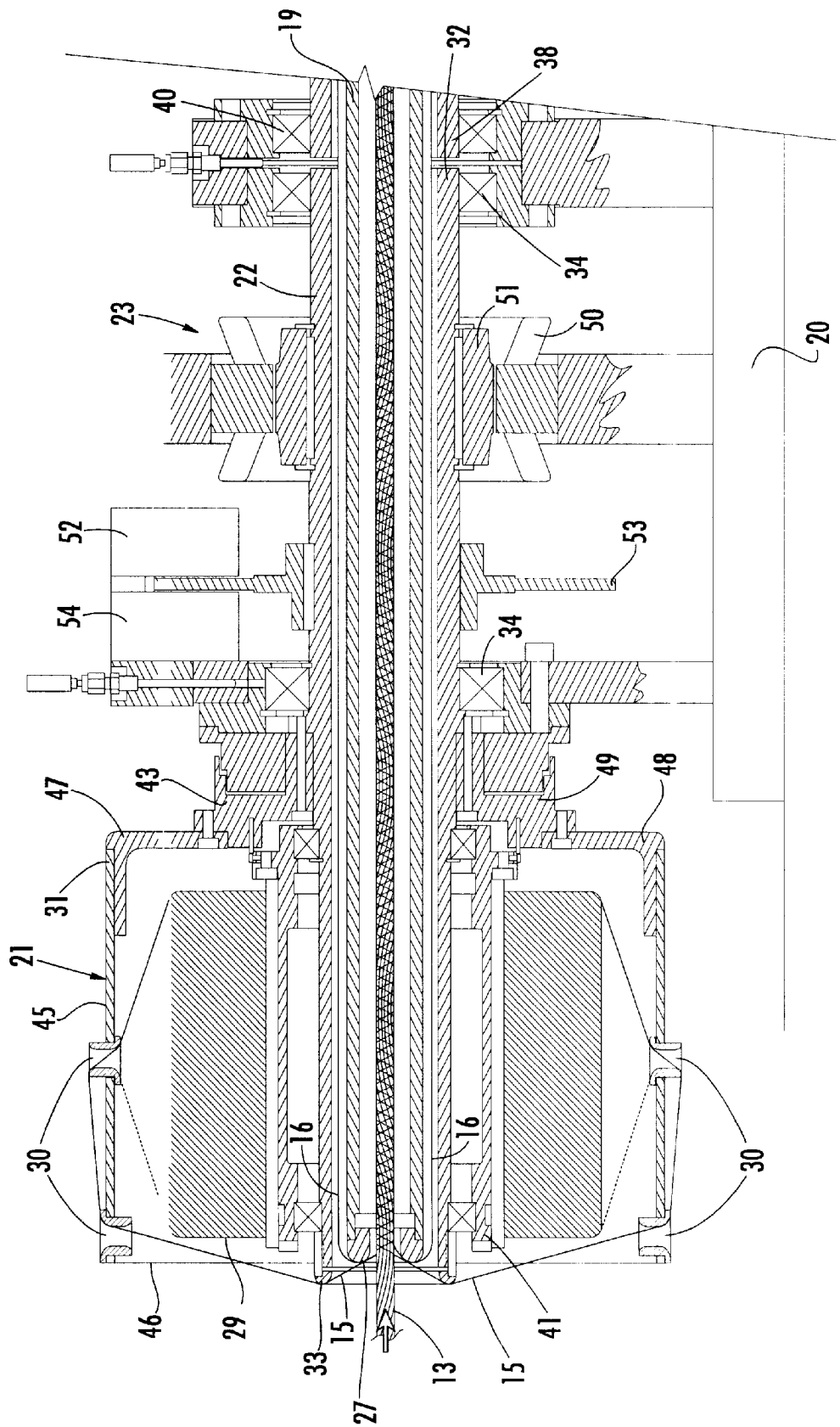
Figure 4B:
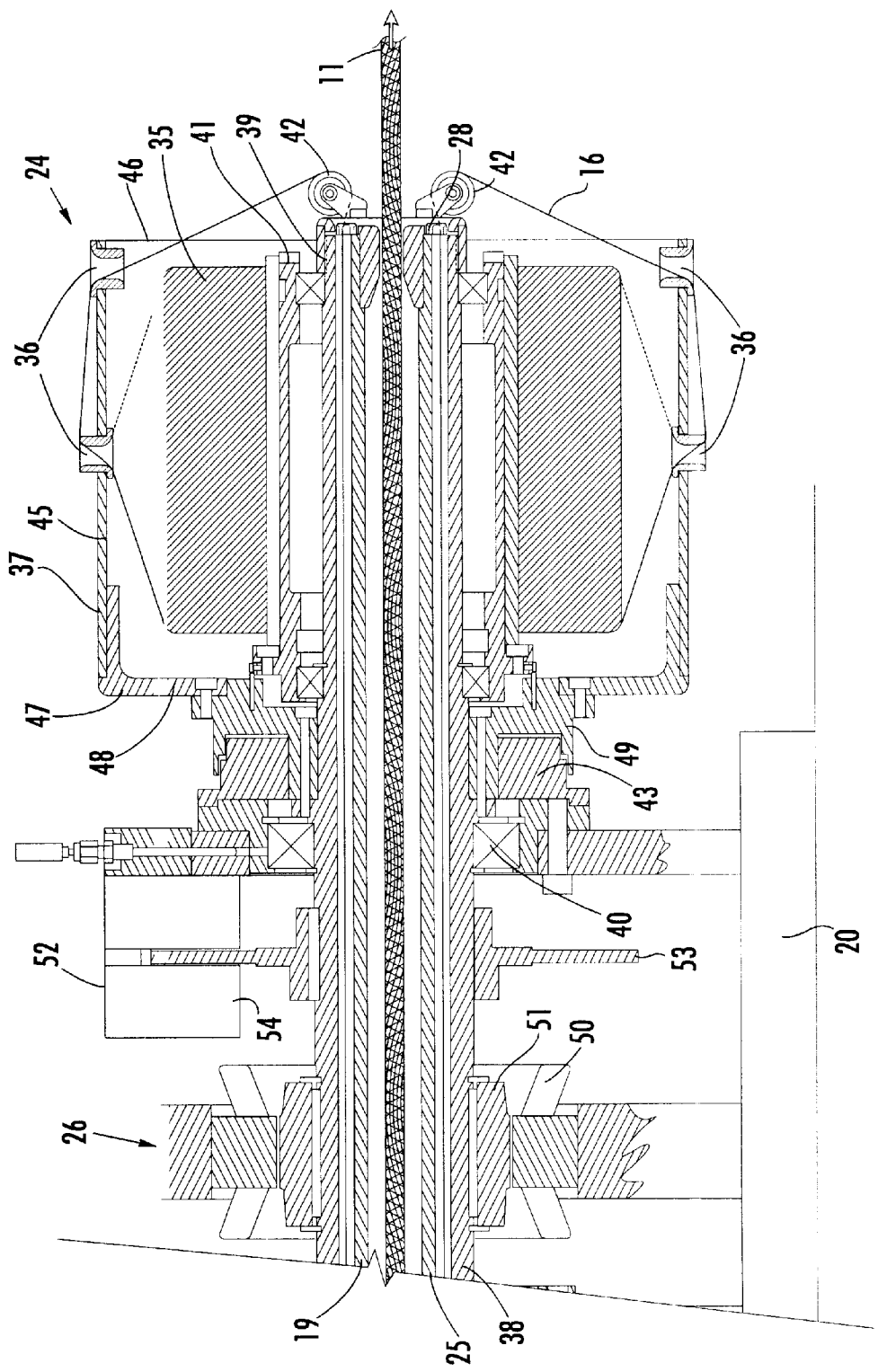

Having thus described the invention in general terms, reference will now be made to the accompanying drawings, which are not necessarily drawn to scale, and wherein:

FIG. 1 is a schematic view of a high-speed binder application device according to the present invention;

FIG. 2 is a cutaway perspective view of a fiber optic cable wrapped in binder material according to the present invention;

FIG. 3 is an enlarged sectional view of the cable illustrated in FIG. 2 and taken along lines 3—3;

FIG. 4A is a partial sectional view of the first binder head and concentric motor according to the present invention; and FIG. 4B is a partial sectional view of the second binder head and concentric motor according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A high-speed binder device 10 according to the present invention is illustrated in FIG. 1. The device 10 is used to manufacture fiber optic cable 11 as shown in FIGS. 2 and 3. The individual optical fibers 12 are typically formed of glass or other light-transmitting material and thus can be quite fragile. Accordingly, one or more optical fibers are encased in several protective buffer tubes 13. The buffer tubes 13 are formed of a flexible plastic material and may be color coded for ease of installation.

The fiber optic cable 11 also often includes a central reinforcing member 14 about which the buffer tubes 13 are arranged to provide strength to the cable. At least one pair of counterrotating yarn-like binders 15, 16 is wound around the buffer tubes 13 to retain the buffer tubes in position against the other buffer tubes and the central reinforcing member 14. One preferred binder material is multifilament untwisted polyester yarn, although other binder materials could be used including other yarn types or tape. A plastic sheath or jacket 17 is then provided over the binders 15, 16 and buffer tubes 13 for added protection. The binder device 10 could also be used to wrap copper or other types of cable.

As described in commonly assigned U.S. Pat. No. 5,826,419, incorporated herein by reference, the central reinforcing member 14 is unwound from a supply spool (not shown) and advanced toward the device 10. Several buffer tubes 13 are advanced from respective supply spools (not shown) into a spaced arrangement with the central reinforcing member 14. The buffer tubes 13 are advanced in a direction generally parallel to the central reinforcing member 14 and through one or more lay plates (not shown). The lay plates have a central opening for the central reinforcing member 14 and a plurality of radially spaced openings for the respective buffer tubes 13. The lay plates are rotated in a predetermined oscillating fashion about the central reinforcing member 14. From the most downstream lay plate, the buffer tubes 13 converge towards the central reinforcing member 14 at a closing point and are laid against the central reinforcing member in an oscillating lay so as to form a cable core structure. The cable core structure is advanced through the high-speed binder device 10 by the pull of a master capstan (not shown). Additionally, an anti-rotation capstan 18 is provided to prevent rotation of the cable core about its axis.

As shown in FIGS. 4A and 4B, the buffer tubes 13 and central reinforcing member 14 pass through the central passage of a hollow center shaft 19 which is fixed to a frame 20. A first binder head 21 is mounted on a first binder shaft 22 that concentrically surrounds the center shaft 19. The first binder shaft 22 is rotatably driven by a first concentric motor 23 to dispense binder 15 onto the buffer tubes 13 at an upstream entrance 27 of the first shaft 22. A second binder head 24 is mounted on a second binder shaft 25 concentrically surrounding the center shaft 19 and rotatably driven by a second concentric motor 26 to dispense binder 16 onto the partially wound buffer tubes 13 as they leave a downstream exit 28 of the second shaft 25.

The first binder head 21 has a binder reel 29 having a supply of binder 15 wound thereon. The first binder head 21 also includes at least a pair of binder guides 30 which are supported on a light-weight guide drum 31. The binder guides 30 are preferably formed of a long-wearing ceramic material and include adjacent inwardly and outwardly facing guides so that the first binder 15 can be threaded in a manner illustrated in FIG. 4A. The first binder reel 29 is supported on the first binder shaft 22 which is in turn rotatably supported on the frame 20. The first binder shaft 22 has a downstream end 32 rotatably supported on the frame 20 and an opposite upstream free end 33. The downstream supported end 32 advantageously is supported by a bearing 34, and an additional bearing 34 supports the shaft 22 at a location intermediate the two ends 32, 33. It will be appreciated that the first binder 15 must be passed into the free end 33 of the binder shaft 22 so that it may be wound under tension around the buffer tubes 13.

The second binder head 24 also includes a binder reel 35 having a supply of binder 16 wound thereon and at least a pair of binder guides 36 supported on a second light-weight guide drum 37 such that the second binder 16 can be threaded in the manner illustrated in FIG. 4B. The second binder reel 35 is supported on the second binder shaft 25 which is, in turn, rotatably supported on the frame 20. The second binder shaft 25 has an upstream end 38 rotatably supported by a bearing 40 mounted on the frame 20 and an opposite downstream free end 39. The shaft 25 is advantageously supported by an additional bearing 40 intermediate of the two ends 38, 39 of the shaft. The second binder 16 is passed over a pair of pulleys 42 mounted on the second binder shaft 25, extends into the space defined between the second binder shaft and the center binder shaft 9 and extends in the direction of the first binder head 21. The second binder 16 then exits the space defined between first binder shaft 22 and the center binder shaft 9 and wraps over the edge of the center binder shaft 9 and onto the partially wound buffer tubes 13 entering the binder shaft. Both yarns 15 and 16 are wound onto the buffer tubes in close proximity to each other (e.g., ¼ inch), but preferably do not touch. Each of the binder heads also includes a brake 52 with a disc 53 and a caliper 54 for stopping the rotation of the shafts 22, 25. Other brake designs could also be used, such as drum brakes.

Each of the binder heads includes a freely rotatable spool 41 on which the respective binder reels 29, 35 are mounted. The spools 41 are mounted concentrically about the respective binder shafts, so as to be freely rotatable on the binder shafts 22, 25 so that the binders 15, 16 are easily paid off from the binder reels. Electromagnetic brakes 43 are provided on the spools 41 for binder tension control. Preferably sensors (not shown) sense the position and speed of the spools 41. Different types of sensors, such as electromagnetic or optical sensors, are common to the art and are therefore not described in more detail herein. Because the open ends of the binder heads 21, 24 face in opposite directions, replacement reels (not shown) can be easily advanced over the fiber optic cable into the position in the binder head formerly occupied by the expended reel after the expended reel has been cut away.

The light-weight guide drums 31, 37 preferably are comprised at least in part of a composite material having a high strength-to-weight ratio, such as a carbon fiber material. In a preferred embodiment, each guide drum weighs approximately 3.6 lbs. The guide drums 31, 37 have a tubular shape and are formed by a substantially cylindrical wall 45 of lightweight material such as fiber composite with a radial thickness of approximately ⅛ of an inch. The guide drum has an open end 46 and a closed end 47. The closed end can comprise an aluminum hub 48 to which the fiber composite wall 45 is adhered with an epoxy material. The aluminum hub 48 includes a flange 49 which is attached to the binder shaft. The low weight of the guide drums 31, 37 virtually eliminates the need for balancing of the drums. In addition, the cylindrical wall configuration results in an even distribution of centrifugal forces through the guide drums 31, 37. The high strength to weight ratio of the carbon fiber guide drums 31, 37 allows them to be rotated at speeds in excess of 4000 RPM, and even 5000 RPM, without failing.

In alternative embodiments, the guide drums 31, 37 could be constructed of other light-weight synthetic materials such as a high-strength plastic. The weight of the lightweight guide drum can vary and depends, in part, upon the size of the guide drum and the proportion of the guide drum constructed from the lightweight materials. Preferably, the guide drum weighs less than 4 lbs. in order to facilitate sustained operation at rotational speeds in excess of about 3800 RPM.

The first and second concentric motors 23, 26 are also suitable for high-speed operation. Each concentric motor includes a stator 50 surrounding a rotor 51 as more fully described in U.S. patent application Ser. No. 09/844,776, filed concurrently herewith and which is incorporated herein by reference. Each stator 50 comprises an electric coil or coils and is fixed to the frame 20. Each rotor 51 is mounted concentrically within its respective stator 50 and is fixed to its respective binder shaft 22 or 25. When the electric coils of the stators 50 are energized, the rotors 51 rotate the binder shafts 22, 25. Rotating the binder shafts also rotates the guide drums 31, 37 which unwind the binder from the binder reels 29, 35 and wrap the binders 15, 16 about the advancing bundle of buffer tubes 13. The concentric mounting of each motor reduces or eliminates problems associated with belt-driven arrangements such as large bending loads on the shafts 22, 25 caused by belt tension, and the mounting of each motor between two supporting bearings eliminates the weight of the motor being cantilevered off of the shaft. The reduction of the loads on each shaft reduces the incidence of vibrations and makes for relatively smooth operation, especially at speeds higher than 4000 RPM. The concentric motors 23, 26 can be run at controlled variable rotational speeds as desired.

The light-weight guide drum construction could be advantageously used in other types of binder devices. In another embodiment, a single light-weight guide drum and concentric motor could be used in a single-head binder device. The single head binder device, like the double-head device described above, can be used for wrapping various binding materials including tapes such as MYLAR® tape or water-swellable cable wrapping tapes, or yarns of various types (e.g., strength yarns, water-swellable yarns, etc.). In a single-head binder device, the cable can pass through the center shaft in either direction. The single-head binder device can also have a supply of spare binder reels ready to replace spent binder reels as described above.

The light-weight guide drum construction could also be employed in a dual head binder system that has a stranding point at the exit of the binder device, such as described in U.S. Pat. No. 5,826,419 to Shelander et al., commonly assigned and incorporated herein by reference. This binder device includes a pair of binder heads concentric with, and surrounding, an oscillator shaft. The oscillator shaft has a plurality of openings for receiving and guiding longitudinally advancing buffer tubes into an oscillating lay. This allows the closing point for the buffer tubes to be downstream of the binder heads and closely adjacent to a locking capstan. As in the first embodiment, the binder heads are facing in opposite directions which allows for easy replacement of spent binder reels.

In another embodiment, the stranding point is between two dual-binder devices and an anti-torsion capstan is downstream from both of the binder devices. The first two binders are rotated together by a concentric motor in one direction, while the second two binders are driven by a second concentric motor in the opposite direction, to produce a double-wrapped cable.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A high-speed binder device for binding together various components of a cable, said device comprising:
   a frame;
   a binder reel rotatably supported on said frame and having a supply of binder wound on the binder reel, said binder reel defining a central opening through which the cable is advanced;
   a drive motor; and
   a guide drum rotatably supported on said frame and operatively connected to the drive motor for paying out binder from the binder reel and wrapping the binder around the cable, said guide drum being comprised of a lightweight synthetic material which allows the guide drum to be rotated at a high rate of speed.

2. The high-speed binder device as defined in claim 1 wherein said guide drum comprises a composite material.

3. The high-speed binder device as defined in claim 2 wherein said guide drum comprises a carbon fiber composite material.

4. The high-speed binder device as defined in claim 1 wherein said guide drum comprises high-strength plastic material.

5. The high-speed binder device as defined in claim 1 wherein the synthetic guide drum is configured to be operable at rotational speeds of at least 4,000 rpm without failing.

6. The high speed binder device as defined in claim 1 wherein the guide drum defines an upstream end and a downstream end and the guide drum is rotatably supported on said frame at only one of said ends.

7. The high speed binder device as defined in claim 1 wherein the guide drum defines a tubular shape having a substantially continuous cylindrical wall.

8. The high-speed binder device as defined in claim 7 wherein said cylindrical wall has a thickness of approximately 1/8 of an inch.

9. The high-speed binder device as defined in claim 1 wherein the guide drum weighs approximately 3.6 lbs.

10. The high-speed binder device as defined in claim 1 wherein the guide drum weighs less than 4 lbs.

11. The high-speed binder device as defined in claim 1 wherein the guide drum and the drive motor are mounted on a common rotatable shaft.

12. The high-speed binder device as defined in claim 1 further comprising a second binder reel rotatably supported on the frame having a second supply of binder wound on the second binder reel, said second binder reel defining a second central opening coincident with the first central opening of the first binder reel and through which the cable is advanced, a second drive motor, and a second guide drum rotatably supported on the frame and operatively connected to the second drive motor for paying out binder from the second binder reel and wrapping the binder around the cable, said second guide drum being comprised of the lightweight synthetic material which allows the second guide drum to be rotated at a high rate of speed.

13. A high-speed binder device for binding together various components of a cable, said device comprising:
   a frame;
   a binder reel rotatably supported on said frame and having a supply of binder wound on the binder reel, said binder reel defining a central opening through which the cable is advanced;
   a drive motor; and
   a guide drum comprising a substantially cylindrical wall of lightweight synthetic material, the guide drum having an open end and a closed end, said closed end comprising a metal hub to which the cylindrical wall is attached, said guide drain rotatably supported on said frame and operatively connected to the drive motor for paying out binder from the binder reel and wrapping the binder around the cable wherein the lightweight synthetic material allows the guide drum to be rotated at a high rate of speed.

14. A guide drum for paying out binder from a binder reel in a high speed binder device that binds together various components of a cable, said guide drum comprising:
   a rotatable tubular body defining;
      a substantially cylindrical wall,
      an upstream end, and
      a downstream end, one of said ends being structured to rotatably support the guide drum on the binder device and the other of said ends being structured to pay out binder around the cable as the binder drum is rotated, and
   wherein said guide drum body is comprised of a lightweight synthetic material which allows the guide drum to be rotated at a high rate of speed.

15. The guide drum as defined in claim 14 wherein said guide drum body comprises a composite material.

16. The guide drum as defined in claim 15 wherein said guide drum body comprises carbon fiber.

17. The guide drum as defined in claim 14 wherein said guide drum body comprises high-strength plastic material.

18. The guide drum as defined in claim 14 wherein the synthetic guide drum is configured to be operated at rotational speeds of at least 4,000 rpm without failing.

19. The guide drum as defined in claim 14 wherein said cylindrical wall has a thickness of approximately 1/8 of an inch.

20. The guide drum as defined in claim 14 wherein the guide drum weighs approximately 3.6 lbs.

21. The high-speed binder device as defined in claim 14 wherein the guide drum weighs less than 4 lbs.

22. A guide drum for paying out binder from a binder reel in a high speed binder device tat binds together various components of a cable, said guide drum comprising:
   a rotatable tabular body defining;
      a substantially cylindrical wall,
      an upstream end, and
      a downstream end, one of said ends comprising a metal hub attached to the substantially cylindrical wall and being structured to rotatably support the guide drum on the binder device, and the other of said ends being structured to pay out binder around the cable as the binder drum is rotated; and
   wherein said guide drum body is comprised of a lightweight synthetic material which allows the guide drum to be rotated at a high rate of speed.

23. A method of binding together various components of a cable at a high speed, said method comprising the steps of:
   advancing the cable through the central opening of a rotatably supported binder reel having a supply of binder wound thereon;
   rotatably supporting a guide drum having a substantially continuous wall extending around the binder reel for paying out binder from the binder reel; and
   driving the guide drum at a rotational velocity that exceeds 4,000 rpm so that the binder is wrapped around the cable at a high rate of speed.

24. The method as defined in claim 23 wherein said driving step further comprises driving a guide drum comprised of a composite material.

25. The method as defined in claim 24 wherein said driving step further comprises driving a guide drum comprised of carbon fiber.

26. The method as defined in claim 23 wherein said driving step further comprises driving a guide drum comprised of high-strength plastic material.

27. The method as defined in claim 23 wherein said rotatably supporting step further comprises supporting the guide drum on a frame at only one of the upstream and downstream ends of the guide drum.

28. The method as defined in claim 23 wherein said rotatably supporting step further comprises supporting the guide drum on a rotatable shaft and said driving step further comprises driving the rotatable shaft with a drive motor that is mounted concentrically around the shaft.

29. A method of binding together various components of a cable at a high speed, said method comprising the steps of:

advancing the cable through the central opening of a rotatably supported binder reel having a supply of binder wound thereon;

rotatably supporting a guide drum having a substantially cylindrical wall attached to a metal hub wherein the wall extends around the binder reel for paying out binder from the binder reel and wherein rotatably supporting includes supporting the guide drum by the hub and on a frame at only one of the upstream and downstream ends of the guide drum; and driving the guide drum at a rotational velocity that exceeds 4000 rpm so that the binder is wrapped around the cable at a high rate of speed.

* * * * *

UNITED STATES PATENT AND TRADEMARK OFFICE
CERTIFICATE OF CORRECTION

PATENT NO.     : 6,560,954 B2
DATED          : May 13, 2003
INVENTOR(S)    : Kepes et al.

It is certified that error appears in the above-identified patent and that said Letters Patent is hereby corrected as shown below:

Column 7,
Line 37, "1/8of" should read -- 1/8 of --.

Column 8,
Line 3, "drain" should read -- drum --;
Line 33, "1/8of" should read -- 1/8 of --;
Line 40, "tat" should read -- that --.

Signed and Sealed this

Fifteenth Day of July, 2003

JAMES E. ROGAN
*Director of the United States Patent and Trademark Office*